United States Patent
Fuwamoto et al.

(10) Patent No.: US 11,702,006 B2
(45) Date of Patent: Jul. 18, 2023

(54) VEHICLE DISPLAY DEVICE

(71) Applicant: TOYOTA JIDOSHA KABUSHIKI KAISHA, Toyota (JP)

(72) Inventors: Yoshitaka Fuwamoto, Mishima (JP); Arata Takada, Toyota (JP); Masayuki Azuma, Miyoshi (JP); Eri Minamino, Kasugai (JP); Tsuyoshi Oba, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/829,857

(22) Filed: Jun. 1, 2022

(65) Prior Publication Data

US 2023/0022634 A1    Jan. 26, 2023

(30) Foreign Application Priority Data

Jul. 21, 2021    (JP) .................................. 2021-120872

(51) Int. Cl.
*B60Q 9/00*        (2006.01)

(52) U.S. Cl.
CPC ..................................... *B60Q 9/00* (2013.01)

(58) Field of Classification Search
CPC ....................................................... B60Q 9/00
See application file for complete search history.

(56) References Cited

U.S. PATENT DOCUMENTS

| 11,341,671 | B2 * | 5/2022 | Lu .......................... G06V 10/145 |
| 2004/0208013 | A1 * | 10/2004 | Dalton, Jr. ............. B60Q 3/252 362/488 |
| 2019/0090091 | A1 * | 3/2019 | Berlitz ................. G01C 21/265 |
| 2021/0188164 | A1 * | 6/2021 | Tontsch .................... B60Q 3/66 |

FOREIGN PATENT DOCUMENTS

JP    2013-152554 A    8/2013

* cited by examiner

*Primary Examiner* — Omeed Alizada
(74) *Attorney, Agent, or Firm* — Oblon, McClelland, Maier & Neustadt, L.L.P.

(57) ABSTRACT

A vehicle display device includes a light emitting device having a light emitting portion that is linear and that is provided at a front side of a vehicle cabin such that direct light that is emitted can be seen by a driver. The light emitting portion is disposed at a height position that is configured to be further toward a lower side than a visual field of the driver in a case in which the driver drives while looking straight ahead.

14 Claims, 7 Drawing Sheets

VEHICLE DISPLAY DEVICE

CROSS-REFERENCE TO RELATED APPLICATION

This application claims priority under 35 USC 119 from Japanese Patent Application No. 2021-120872 filed Jul. 21, 2021, the disclosure of which is incorporated by reference herein in its entirety.

BACKGROUND

Technical Field

The present disclosure relates to a vehicle display device.

Related Art

Japanese Patent Application Laid-Open (JP-A) No. 2013-152554 discloses a vehicle display device. Briefly, this vehicle display device is provided with a light emitting device having a linear light emitting portion that is provided on the upper surface of an instrument panel of a vehicle. In such a device, the linear light emitting portion emits light and can effectively alert the driver.

SUMMARY

However, the linear light emitting portion in the above-described related art is within the visual field of a driver when the driver drives while looking straight ahead. Therefore, in cases in which, for example, the degree of the necessity of alerting the driver is low or the like, there is the concern that the driver may find the emission of light by the linear light emitting portion to be annoying.

In view of the above-described circumstances, the present disclosure provides a vehicle display device that, while causing a driver to recognize light that is emitted from a light emitting portion, can reduce possibility for the driver to feel annoyed by the light emission.

A vehicle display device of a first aspect of the present disclosure includes a light emitting device having a light emitting portion that is linear and that is provided at a front side of a vehicle cabin such that direct light that is emitted can be seen by a driver, and the light emitting portion is disposed at a height position that is further toward a lower side than a visual field of a driver in a case in which the driver drives while looking straight ahead.

In accordance with the above-described structure, the linear light emitting portion of the light emitting device is provided at the front side of the vehicle cabin such that the driver can see the emitted direct light. Therefore, when the linear light emitting portion emits light, the driver can recognize the emitted direct light. The light emitting portion is disposed at a height position that is further toward the lower side than the visual field of the driver in a case in which the driver drives while looking straight ahead. The extent to which the driver feels annoyed by the light emission by the light emitting portion can be suppressed.

In a vehicle display device of a second aspect of the present disclosure, in the structure of the first aspect, a position at which the light emitting portion is disposed is determined such that a direction, in which the light emitting portion is viewed from a position that is assumed to be an eye point of the driver, falls within a range of angles of depression from 20° to 40° as seen in a vehicle side view, with respect to a vehicle horizontal direction that passes-through the position that is assumed to be the eye point.

In accordance with the above-described structure, when the light emitting portion emits light in a state in which the driver has lowered his/her gaze, the driver can satisfactorily be made to notice the light emitted by the light emitting portion.

In a vehicle display device of a third aspect of the present disclosure, in the structure of the first aspect or the second aspect, the light emitting portion is provided at a portion that includes an intermediate region in a vehicle transverse direction at the front side of the vehicle cabin, and emits light at a blinking period of 200 ms to 600 ms.

In accordance with the above-described structure, when the light emitting portion emits light in a state in which the driver has lowered his/her gaze, the driver can satisfactorily be made to notice the light emitted by the light emitting portion. Further, because the blinking period is 200 ms to 600 ms, the extent to which the driver feels annoyed by the light emission can be suppressed well.

In a vehicle display device of a fourth aspect of the present disclosure, in the structure of any one of the first aspect through the third aspect, an eaves portion, which extends obliquely toward a vehicle upward and rearward side from a region that is adjacent to the light emitting portion at an upper side of the light emitting portion, is provided.

In accordance with the above-described structure, even in a case in which sunlight passes through the front windshield of the vehicle and enters into the vehicle cabin, the eaves portion can block the direct entry of sunlight into the light emitting portion. Accordingly, it is possible to prevent or suppress recognition of the direct light from the light emitting portion from being hindered due to sunlight.

In a vehicle display device of a fifth aspect of the present disclosure, in the structure of any one of the first aspect through the fourth aspect, a lens cover is provided at a surface of the light emitting portion, the surface facing an inner side of the vehicle cabin, and a light diffusing portion is formed at the lens cover so that light from the inner side of the vehicle cabin is diffused and an interior of the light emitting portion is prevented from being seen in a non-emitting state.

In accordance with the above-described structure, the lens cover is provided at the surface of the light emitting portion, the surface facing the inner side of the vehicle cabin, and the light diffusing portion is formed at the lens cover. The light diffusing portion diffuses light from the inner side of the vehicle cabin and the interior of the light emitting portion is prevented from being seen in a non-emitting state. Therefore, the appearance of the light emitting portion that is in a non-emitting state can be made to be well.

In a vehicle display device of a sixth aspect of the present disclosure, in the structure of any one of the first aspect through the fifth aspect, the light emitting portion is provided at a boundary between an upper panel, which structures an upper portion of an instrument panel provided at a front portion of the vehicle cabin, and a lower panel, which structures a lower portion of the instrument panel and is joined to the upper panel.

In accordance with the above-described structure, the structure in which the light emitting portion is provided at the instrument panel can be manufactured more easily than in a case in which, for example, a portion for assembly of the light emitting portion is provided only at the lower panel of the instrument panel and the light emitting portion is assembled to the lower panel of the instrument panel.

A vehicle display device of a seventh aspect of the present disclosure, in the structure of any one of the first aspect through the sixth aspect, further includes a memory, a processor coupled to the memory, and an information acquiring device that acquires information of a periphery of a vehicle. In a case in which the processor determines, based on information acquired by the information acquiring device, that a degree of necessity of alerting the driver is within a predetermined range that is lower than a preset reference, the processor controls the light emitting device to emit light by the light emitting portion.

In accordance with the above-described structure, the information acquiring device acquires information relating to the periphery of the vehicle. Further, in a case in which the processor determines, based on the information acquired by the information acquiring device, that the degree of the necessity of alerting the driver is within a predetermined range that is lower than a preset reference, the processor controls the light emitting device so as to emit light by the light emitting portion. Due thereto, in a case in which the degree of the necessity of alerting the driver is within a predetermined range that is lower than a preset reference, the driver can be alerted to the extent that the driver is not annoyed that much.

In a vehicle display device of an eighth aspect of the present disclosure, in the structure of the sixth aspect, the light emitting portion extends substantially in a vehicle transverse direction.

As described above, in accordance with the vehicle display device of the present disclosure, there is the excellent effect that, while the driver is made to recognize light that is emitted from a light emitting portion, the driver is prevented from feeling annoyed by the light emission.

BRIEF DESCRIPTION OF THE DRAWINGS

A preferred embodiment will be described in detail based on the following figures, wherein.

DETAILED DESCRIPTION

An exemplary embodiment of the present invention is described by using FIG. 1 to FIG. 7. Note that, in these drawings, arrow FR that is appropriately illustrated indicates the front side of the vehicle, arrow UP indicates the upper side of the vehicle, and arrow W indicates the vehicle transverse direction.

(Structure of Exemplary Embodiment)

Figure 1:
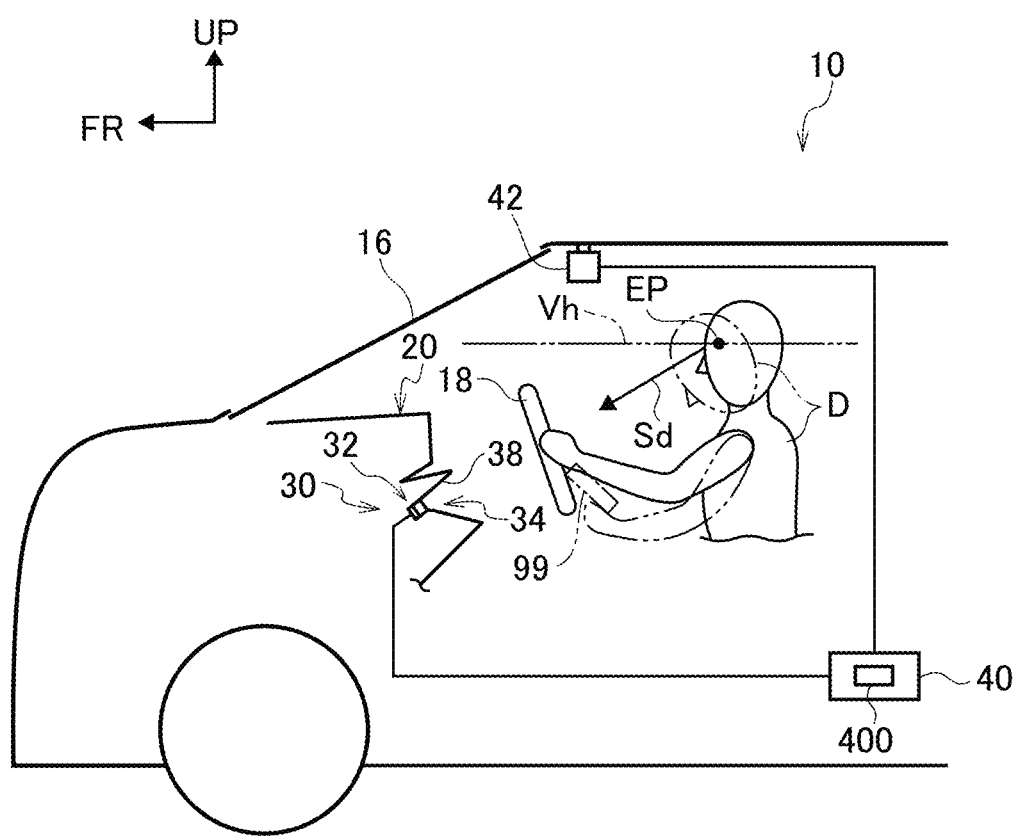
FIG. 1 is a drawing illustrating, in a vehicle side view, the schematic structures of a vehicle display device relating to an exemplary embodiment of the present invention and the periphery thereof.
Figure 2:
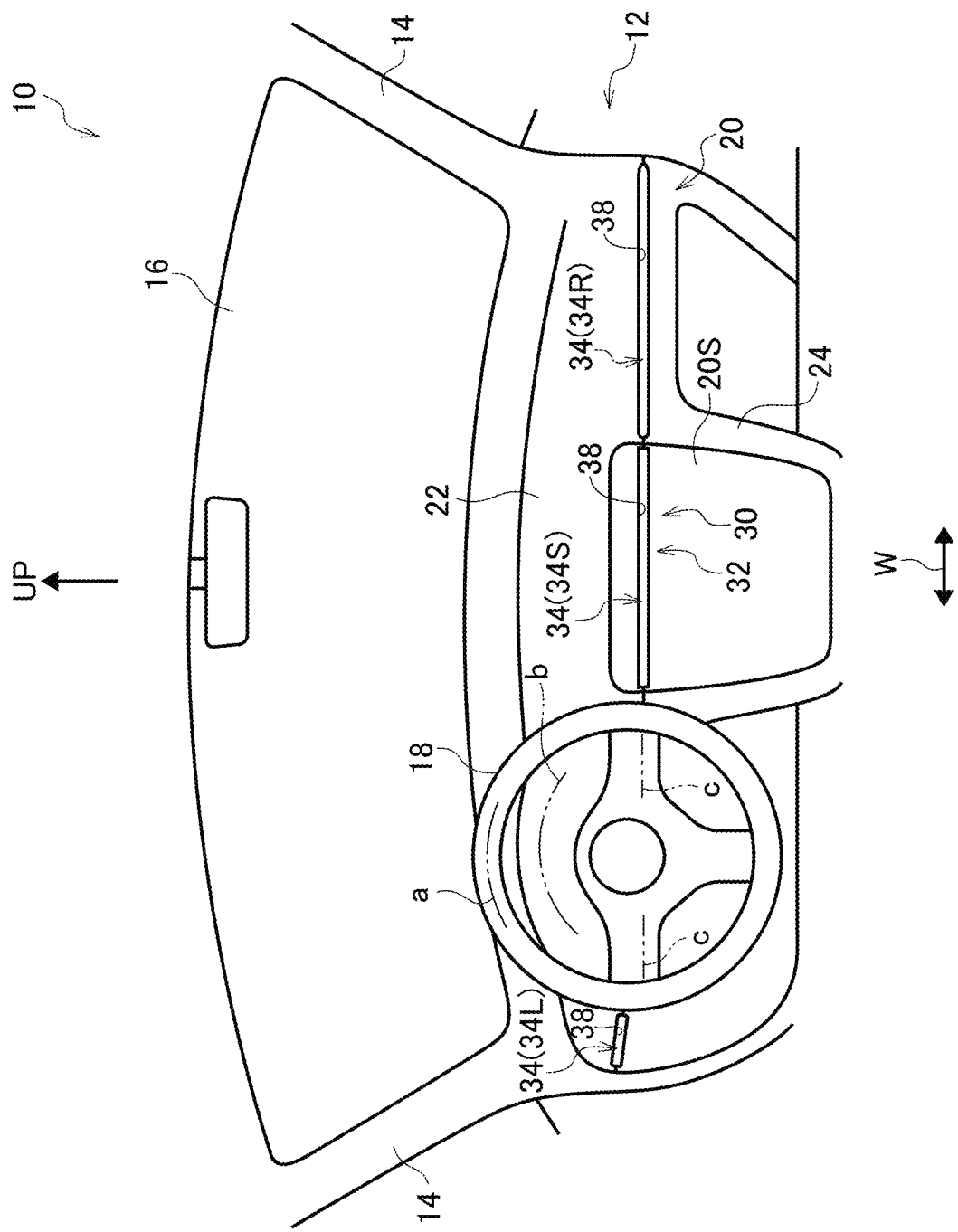
FIG. 2 is a diagram illustrating the schematic structure of the front portion of a vehicle cabin of a vehicle in which the vehicle display device is installed.

The schematic structure of a vehicle display device 30 relating to the present exemplary embodiment and the periphery thereof are illustrated in FIG. 1 that is seen in a vehicle side view. The schematic structure of a vehicle cabin front portion 12 of a vehicle 10 in which the vehicle display device 30 is installed is illustrated in FIG. 2. Note that the vehicle 10 in the present exemplary embodiment is, for example, a so-called left-hand drive vehicle. In the case of a so-called right-hand drive vehicle, the structure illustrated in FIG. 2 is reversed left and right.

As illustrated in FIG. 2, a front windshield 16 is provided between a pair of left and right front pillars 14 at the front end side and upper side of the vehicle cabin front portion 12. An instrument panel 20, which bulges-out toward an inner side of the vehicle cabin, is provided at the lower side of the front windshield 16. Moreover, a steering wheel 18, which is fixed to a steering shaft (not illustrated) that passes-through the instrument panel 20, is provided at the driver's seat side (the left side in the drawing of FIG. 2).

The upper portion of the instrument panel 20 is structured by an upper panel 22. The lower portion of the instrument panel 20 is structured by a lower panel 24. An upper end side of the lower panel 24 is joined to a lower end side of the upper panel 22. Further, a center cluster portion 20S is provided at an intermediate region in the vehicle transverse direction of the instrument panel 20.

As illustrated in FIG. 1, the vehicle display device 30 includes a light emitting device 32, an ECU (Electronic Control Unit) 40, and periphery monitoring devices 42 serving as an information acquiring section. Note that the vehicle display device 30 of the present exemplary embodiment can also be understood as a vehicle driving assist device. The light emitting device 32 has linear light emitting portions 34 that are illustrated in FIG. 2. The light emitting portions 34 are provided on the instrument panel 20 at the front side of the vehicle cabin such that the direct light emitted from the light emitting portions 34 can be seen by a driver D (see FIG. 1). In the present exemplary embodiment, the light emitting portions 34 are provided at the boundary between the upper panel 22 and the lower panel 24 at the instrument panel 20.

Figure 3:
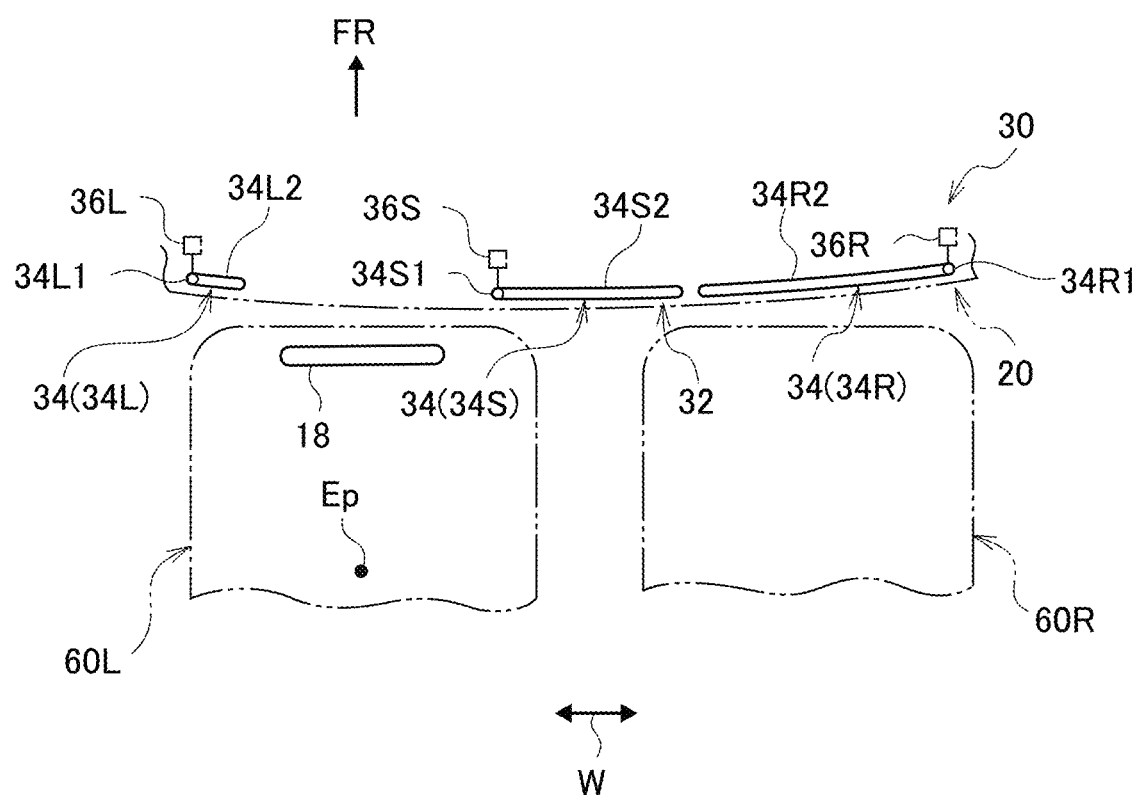
FIG. 3 is a schematic plan view illustrating an example of a position at which the light emitting portions of a light emitting device is disposed, in a state of being viewed from a vehicle upper side.

An example of the position at which the light emitting portions 34 is disposed is illustrated in FIG. 3 in a schematic plan view in a state of being viewed from the vehicle upper side. As illustrated in FIG. 2 and FIG. 3, as an example, a total of three of the light emitting portions 34 that are a left-side light emitting portion 34L, a central light emitting portion 34S, and a right-side light emitting portion 34R are provided. The left-side light emitting portion 34L, the central light emitting portion 34S, and the right-side light emitting portion 34R all extend along the vehicle transverse direction. As illustrated in FIG. 3, the left-side light emitting portion 34L is set at the front side of a driver's seat 60L and further toward the vehicle transverse direction outer side than the steering wheel 18. The central light emitting portion 34S is set at the center cluster portion 20S (see FIG. 2). The right-side light emitting portion 34R is set at the front side of a front passenger's seat 60R. The left-side light emitting portion 34L, the central light emitting portion 34S, and the right-side light emitting portion 34R are all set such that the entire lengths of the left-side light emitting portion 34L, the central light emitting portion 34S, and the right-side light emitting portion 34R can be seen by the driver D (see FIG. 1). Note that, in the following explanation, when the left-side light emitting portion 34L, the central light emitting portion 34S, and the right-side light emitting portion 34R are collectively referred to without differentiating therebetween, they are called the light emitting portions 34.

As an example, the light emitting portions 34 include light sources 34L1, 34S1, 34R1 that emit light, and linear light guides 34L2, 34S2, 34R2 whose proximal ends are connected to the light sources 34L1, 34S1, 34R1. As an example, LEDs can be used as the light sources 34L1, 34S1, 34R1. The light guides 34L2, 34S2, 34R2 are structured to guide the lights from the light sources 34L1, 34S1, 34R1, which are incident from proximal ends of the light guides 34L2, 34S2, 34R2, to the distal end sides thereof. The luminance of the light emitting portions 34 is preferably from 80 $cd/m^2$ to 200 $cd/m^2$, and more preferably from 160 $cd/m^2$ to 200 $cd/m^2$, and in the present exemplary embodiment is 160 $cd/m^2$, from the standpoints of making the driver D notice the light emitted by the light emitting portions 34 and of suppressing the driver D feeling annoyed by the light emission.

As illustrated in FIG. 1, the light emitting portions 34 are set at a height position that is further toward the lower side than the visual field of a driver D when the driver D looks straight ahead. The positions at which the light emitting portions 34 are disposed are set such that direction Sd, in which the light emitting portions 34 are viewed from position Ep that is assumed to be the eye point of the driver D, is within the range of angles of depression of 20° to 40° (more preferably 25° to 35°) as seen in a vehicle side view, with respect to the vehicle horizontal direction (refer to two-dot chain line Vh) that passes-through the position Ep.

Figure 4:
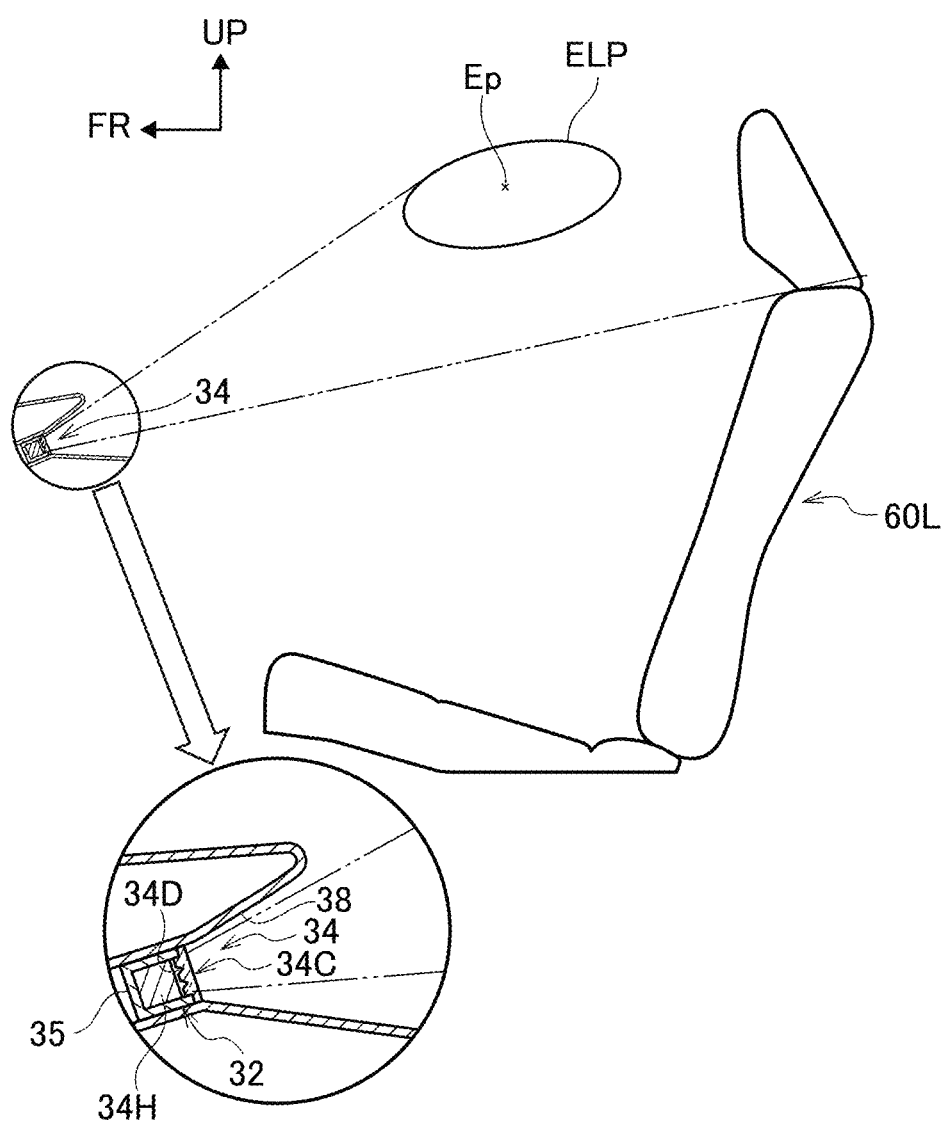
FIG. 4 is a drawing schematically illustrating an ellipse that represents the distribution range of positions of eyes of drivers with different physiques and the height position of the light emitting portions of the light emitting device as seen in a vehicle side view, and illustrating the light emitting portions and the periphery thereof in a partially enlarged manner.

FIG. 4 schematically illustrates ellipse ELP and the height position of the light emitting portions 34 of the vehicle display device 30 in a vehicle side view. The ellipse ELP is set in an oval shape based on an eye range that statistically represents the distribution of positions of eyes of drivers with different physiques. In the present exemplary embodiment, based on these statistics, the position Ep that is assumed to be the eye point of the driver D is set at a central portion within the ellipse ELP. Note that, as an example, the 95th percentile ellipse can be used as the ellipse ELP.

Figure 5:
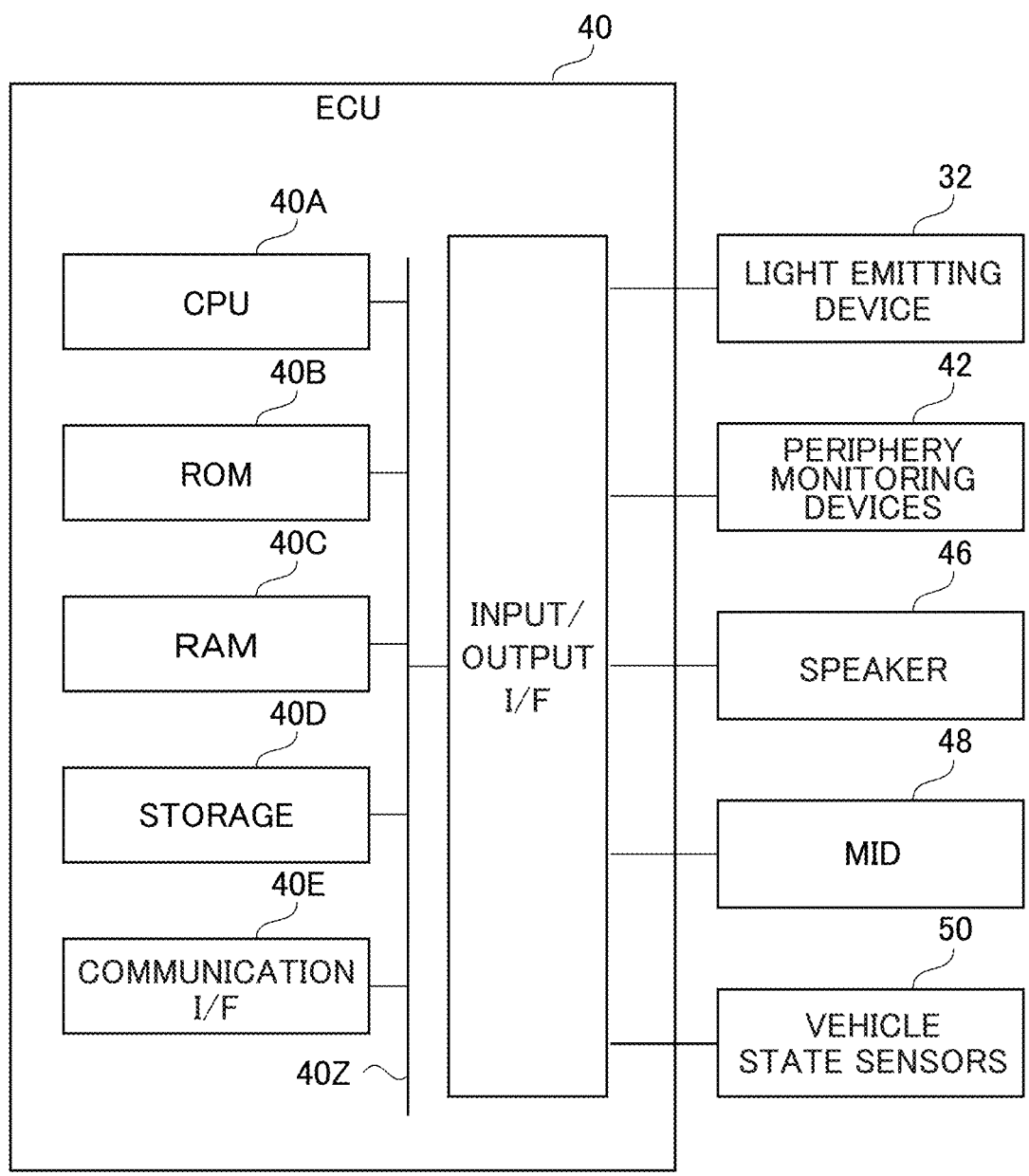
FIG. 5 is a block drawing illustrating an example of hardware structures of an ECU and the like of the vehicle display device.

As illustrated in FIG. 3, the light emitting device 32 includes light source control sections 36L, 36S, 36R (illustrated in block forms in the drawing) that cause the light sources 34L1, 34S1, 34R1 to blink at a predetermined time. The light source control sections 36L, 36S, 36R are connected to the ECU 40 that is illustrated in FIG. 5 and is described in detail later. Due to the light source control sections 36L, 36S, 36R controlling the light emission of the light sources 34L1, 34S1, 34R1, the light emitting portions 34 emit light at a blinking period that is a predetermined period. The blinking period of the light emitting portions 34 is preferably 200 ms to 600 ms, and more preferably 400 ms to 600 ms, and is 600 ms as an example in the present exemplary embodiment.

As illustrated in the schematic, partial, enlarged view of FIG. 4, the light emitting portion 34 is provided with a lens cover 34C on the surface of the light emitting portion 34 that faces toward the inner side of the vehicle cabin. The lens covers 34C cover light emitting portion main bodies 34H (illustrated in the drawings in a simplified manner), which are structured by the light sources 34L1, 34S1, 34R1 (see FIG. 3) and the light guides 34L2, 34S2, 34R2 (see FIG. 3), from the vehicle cabin side. Note that, as an example, the light emitting portion main bodies 34H are housed in cases 35 whose vehicle cabin sides are open, and the lens covers 34C are attached to the open sides of these cases 35. Note that illustration of the lens covers 34C and the cases 35 is omitted in FIG. 3.

As illustrated in FIG. 4, a light diffusing portion 34D, which diffuses light from the vehicle cabin side so as to make it difficult to see the interior of the light emitting portion 34 that is in a non-emitting state, is formed at the lens cover 34C. As an example, the light diffusing portion 34D is formed at the surface of the lens cover 34C that is opposite the surface at the vehicle cabin side. However, the light diffusing portion 34D may be formed at the surface of the lens cover 34C that is at the vehicle cabin side, or at both surfaces of the lens cover 34C at the vehicle cabin side and at the opposite side. Further, an eaves portion 38 extends obliquely toward a vehicle upward and rearward side from a region that is adjacent to the light emitting portion 34 at the upper side of the light emitting portion 34. The eaves portion 38 extends along the vehicle transverse direction so as to correspond to the entire length of the light emitting portion 34 in the vehicle transverse direction (see FIG. 2). Note that, in FIG. 4, an example of the range over which the light emitting portion 34 radiates light is illustrated by the two-dot chain line.

An example of hardware structures of the ECU 40 to which the light emitting device 32 is connected, and of respective structural portions that are connected to the ECU 40, is illustrated in a block diagram in FIG. 5. As illustrated in FIG. 5, not only the light emitting device 32, but also the periphery monitoring devices 42, a speaker 46, an MID (Multi Information Display) 48, and vehicle state sensors 50 are connected to the ECU 40.

The periphery monitoring devices 42 acquire information relating to the periphery of the vehicle 10 that is the own vehicle.

The periphery monitoring device 42 includes, for example, a radar that senses vehicles ahead that are traveling at the front side in the advancing direction of the vehicle 10, and the like, and a camera that captures peripheral information of the vehicle 10. Note that, although the periphery monitoring devices 42 are disposed at plural places at the vehicle 10, FIG. 1 illustrates one of them in a simplified manner for convenience. The ECU 40 illustrated in FIG. 5 executes various types of control based on information and the like acquired by the periphery monitoring devices 42. The ECU 40 will be described later.

The speaker 46 generates sounds such as buzzer sounds and the like to warn the driver D. The MID 48 is structured to include a liquid crystal display that has a touch panel that enables touch operation, and can display a wide variety of information including alerting information and warning information. The vehicle state sensors 50 acquire information expressing the traveling state and the operated state of the vehicle 10. The vehicle state sensors 50 include, for example, a steering angle sensor that detects the steering angle of the vehicle 10, and a vehicle speed sensor that detects the traveling speed of the vehicle 10.

The ECU 40 can execute driving assist control by alerting. Control for TMN (preceding vehicle departure notification function) is an example of such driving assist control. Although detailed explanation of the control for TMN is omitted, as an example, control for TMN also is executed during execution of ACC (Adaptive Cruise Control).

The ECU 40 is structured to include a CPU (Central Processing Unit: processor) 40A, a ROM (Read Only Memory) 40B, a RAM (Random Access Memory) 40C, a storage 40D, a communication interface (abbreviated as "communication I/F" in FIG. 5) 40E, and an input/output interface (abbreviated as "input/output I/F" in FIG. 5) 40F. The CPU 40A, the ROM 40B, the RAM 40C, the storage 40D, the communication interface 40E, and the input/output interface 40F are connected through a bus 40Z so as to be able to communicate with one another.

The CPU 40A is a central processing unit that executes various programs and controls various sections. Namely, the CPU 40A reads-out a program from the ROM 40B or the storage 40D, and executes the program by using the RAM 40C as a workspace. The CPU 40A controls the respective structures and performs various computing processings in accordance with programs recorded in the ROM 40B or the storage 40D.

The ROM 40B stores various programs and various data. The RAM 40C temporarily stores programs and data as a workspace. The storage 40D is structured by a storage device such as an HDD (Hard Disk Device) or an SSD (Solid State Drive), and stores various programs and various data. In the present exemplary embodiment, a preceding vehicle departure notification program and the like are stored in the ROM 40B or the storage 40D. The communication interface 40E is an interface used by the vehicle display device 30 to communicate with other devices.

The input/output interface 40F is an interface for communication with various devices installed in the vehicle 10. As an example, the light emitting device 32, the periphery monitoring devices 42, the speaker 46, the MID 48, and the vehicle state sensors 50 are connected to the ECU 40 of the present exemplary embodiment through the input/output interface 40F.

As illustrated by a block in FIG. 1, the ECU 40 has a control section 400 as a functional structure of the ECU 40. The ECU 40 functions as the control section 400 (see FIG. 1) due to the CPU 40A illustrated in FIG. 5 reading-out and executing a program (e.g., the aforementioned preceding vehicle departure notification program) that is stored in the ROM 40B or the storage 40D.

In a case in which the control section 400 determines, based on the information acquired by the periphery monitoring devices 42, that the degree of the necessity of alerting the driver is within a predetermined range that is lower than a preset standard, the control section 400 illustrated in FIG. 1 controls the light emitting device 32 so as to emit light by the light emitting portions 34

(Operation of Exemplary Embodiment)
Operation of the present exemplary embodiment is described next.

Preceding vehicle departure notification control processing by the ECU 40 is carried out due to the CPU 40A illustrated in FIG. 5 reading-out the preceding vehicle departure notification program from the ROM 40B or the storage 40D, and expanding and executing the preceding vehicle departure notification program in the RAM 40C.

In a case of executing the preceding vehicle starting notification program, based on the information acquired by the periphery monitoring devices 42, immediately after the preceding vehicle, which is stopped in a state in which the vehicle 10 that is the own vehicle is stopped, departs (as an example, at the time when the preceding vehicle advances ahead by 0.1 m), the CPU 40A determines that the degree of the necessity of alerting the driver D is within a predetermined range that is lower than a preset reference, and controls the light emitting device 32 so as to emit light by the light emitting portions 34 (see FIG. 2), and controls the MID 48 so as to cause preceding vehicle departure information to be displayed. Due thereto, the driver D can be alerted gently.

Note that the blinking that is performed by the light emitting portions 34 is carried out several times (e.g., twice) as an example.

Thereafter, in a case in which the vehicle 10 has not departed despite the further forward movement of the preceding vehicle by a predetermined distance (4 m as an example), the CPU 40A controls the speaker 46 so as to generate a buzzer sound. Note that the buzzer sound from the speaker 46 is continued until the vehicle 10 departs. Further, as an example, the above-described display of the preceding vehicle departure information by the MID 48 is continued until the vehicle 10 departs.

As described above, in the present exemplary embodiment, it is possible to alert the driver D in two stages. The light emitting portions 34, which are illustrated in FIG. 1 and are used for gentle alerting in a first stage, are provided at the front side of the vehicle cabin such that the driver D can see the direct light emitted from the light emitting portions 34. Therefore, when the light emitting portions 34 emit light, the driver D can recognize the emitted direct light. Here, the light emitting portions 34 are set at a height position that is lower than the visual field of the driver when the driver D drives while looking straight ahead. Therefore, the extent to which the driver D feels annoyed by the light emission by the light emitting portions 34 can be suppressed.

Further, the position at which the light emitting portions 34 is disposed is set such that that the direction Sd, in which the light emitting portions 34 are viewed from the position Ep that is assumed to be the eye point of the driver D, falls within a range of angles of depression of 20° to 40° as seen in a vehicle side view, with respect to the vehicle horizontal direction (refer to the two-dot chain line Vh) that passes-through the position Ep. Therefore, when the light emitting portions 34 emit light in a state in which the driver D has lowered his/her gaze (refer to the driver D illustrated by the two-dot chain lines in FIG. 1), the driver D can satisfactorily be made to notice the light emitted by the light emitting portions 34.

Figure 6:
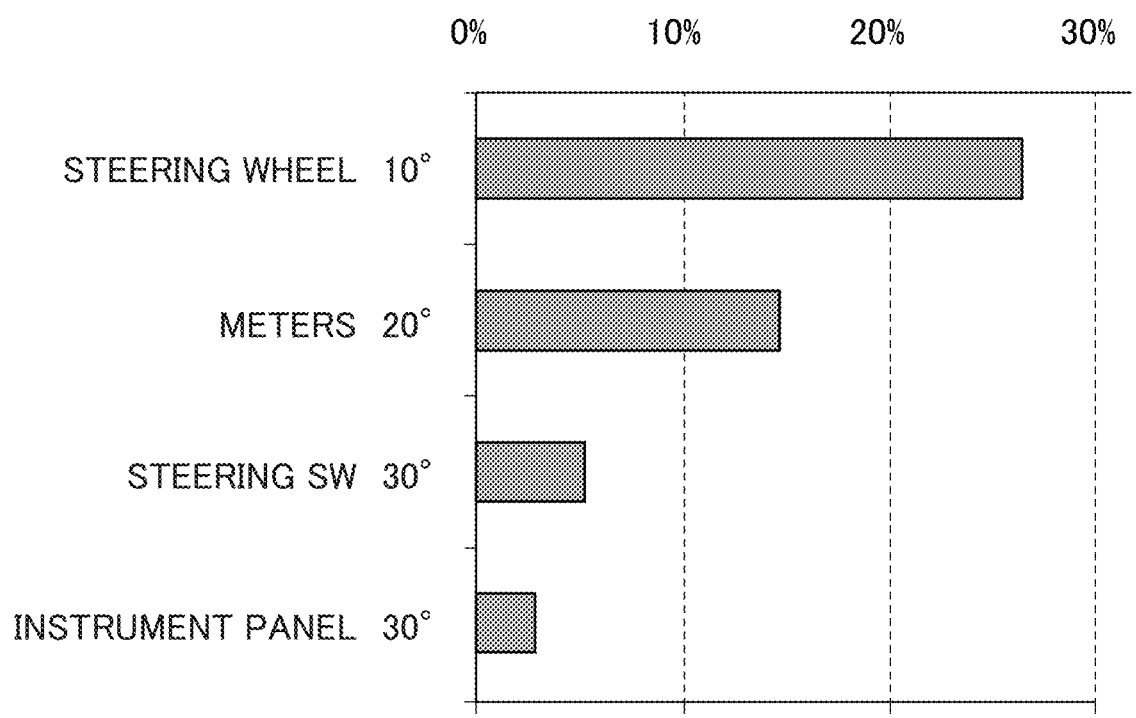
FIG. 6 is a bar graph illustrating the relationship between the set position of the light emitting portions and a notification overlooking rate.

Supplemental explanation regarding this point follows. FIG. 6 illustrates test results showing the relationship between the set position of the light emitting portions and a notification overlooking rate by a driver. As illustrated by the two-dot chain lines in FIG. 1, this test is such that the driver D is asked to play a game using a smartphone 99 disposed at the near side of the lower portion of the steering wheel 18, and raises his/her face when noticing the light emitted by the light emitting portions (34). Moreover, the game employs a technique in which the driver D searches for and taps on a large circle on the screen.

In the graph of FIG. 6, the vertical axis indicates the location at which the light emitting portions are disposed, and the degree of the angle of depression of the viewing direction, with respect to the vehicle horizontal direction (refer to two-dot chain line Vh in FIG. 1), in a case in which the driver D is looking at the light emitting portions. "Steering wheel 10°" corresponds to the upper portion of the rim portion of the steering wheel, which is in the vicinity of the portion labeled "a" in FIG. 2. "Meters 20°" corresponds to the portion above the meters, which is in the vicinity of the portion labeled b in FIG. 2. "Steering SW 30°" corresponds to vicinities of the switch operating portions at left and right spoke portions of the steering wheel, that are in the vicinities of the portions labelled c in FIG. 2. "Instrument panel 30°" refers to the portion where the light emitting portions 34 are disposed in the present exemplary embodiment. Note that, although not illustrated in the drawings, the widths (dimensions in the short-side directions) of the respective light emitting portions are substantially the same. Further, the horizontal axis of the graph of FIG. 6 is the rate of overlooking the notification by the light emitting portions (i.e., the light emission by the light emitting portions). From the graph of FIG. 6, it can be understood that, when the angle of depression is 20° or less, the overlooking rate decreases, and when the angle of depression is 30°, the overlooking rate becomes very low.

Further, in the present exemplary embodiment, as illustrated in FIG. 2, the light emitting portions 34 are provided at a portion that includes an intermediate region in the vehicle transverse direction (the center cluster portion 20S) at the front side of the vehicle cabin, and emit light at a blinking period of 200 ms to 600 ms. Therefore, when the light emitting portions 34 emit light in a state in which the driver D illustrated in FIG. 1 has lowered his/her gaze (refer to the driver D illustrated by the two-dot chain lines in the drawing), the driver D can satisfactorily be made to notice the light emitted by the light emitting portions 34. Moreover, because the blinking period is 200 ms to 600 ms, the extent to which the driver D feels annoyed by the light emission can be suppressed well.

Figure 7:
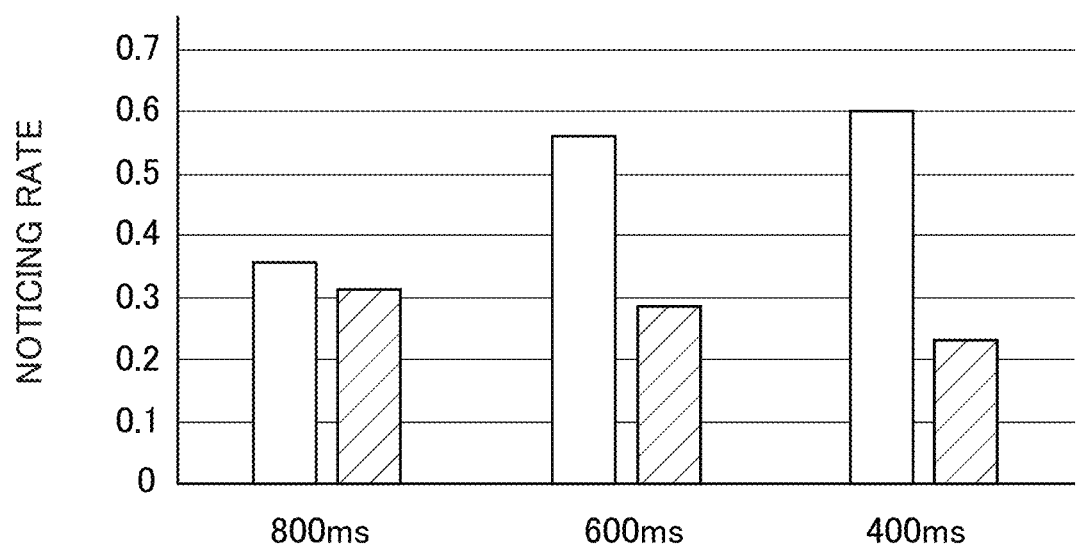
FIG. 7 is a bar graph illustrating the relationship between blinking settings and the like of the light emitting portions and a noticing rate.

Supplemental description of this point follows. FIG. 7 illustrates test results showing the relationship between the flashing setting and the like of the light emitting portions, and the rate of noticing the light emission. This test is substantially the same as the test described with reference to FIG. 6, with the exception of the setting of the flashing of and the setting of the placement of the light emitting portions. Note that the environmental illuminance of the upper surface of the instrument panel during the test is 50,000 lx or more. The horizontal axis in FIG. 7 indicates the blinking period of the light emitting portions, and the vertical axis indicates the rate at which the blinking of the light emitting portions is noticed (cases in which all are noticed are a rate of 1). Further, among the bar graphs, those with hatching indicate cases in which the left-side light emitting portion 34L and the right-side light emitting portion 34R are made to emit light (namely, cases in which the central light emitting portion 34S is not included), while those without hatching indicate cases in which the left-side light emitting portion 34L, the central light emitting portion 34S, and the right-side light emitting portion 34R are made to emit light. From this graph, it can be understood that the noticing rate markedly increases when the blinking period is 600 ms or less in a case in which the central light emitting portion 34S is made to emit light.

Moreover, in the present exemplary embodiment, as illustrated in the schematic, partial, enlarged view of FIG. 4, the eaves portion 38, which extends obliquely toward a vehicle upward and rearward side from a region that is adjacent to the light emitting portion 34 at the upper side of the light emitting portion 34, is provided. Therefore, even in a case in which sunlight passes through the front windshield 16 of the vehicle 10 and enters into the vehicle cabin, the eaves portion 38 can block the direct entry of sunlight into the light emitting portion 34. Accordingly, it is possible to prevent or suppress recognition of the direct light from the light emitting portion 34 from being hindered due to sunlight.

As described above, in accordance with the vehicle display device 30 of the present exemplary embodiment, while the driver D is made to recognize the light emitted from the light emitting portions, it can reduce or prevent the driver D from feeling annoyed by the light emission.

Further, in the present exemplary embodiment, as illustrated in the schematic, partial, enlarged view of FIG. 4, the lens cover 34C is provided at the light emitting portion 34 at the surface of the light emitting portion 34 facing the inner side of the vehicle cabin, and the light diffusing portion 34D, which diffuses light from the inner side of the vehicle cabin so as to prevent the interior of the light emitting portion 34 that is in a non-emitting state from being seen, is provided at the lens cover 34C. Therefore, the appearance of the light emitting portion 34 that is in a non-emitting state can be made to be well.

Further, in the present exemplary embodiment, as illustrated in FIG. 2, the light emitting portion 34 is provided at the boundary between the upper panel 22 and the lower panel 24 of the instrument panel 20. Therefore, the structure in which the light emitting portions 34 are provided at the instrument panel 20 can be manufactured more easily than in cases in which, for example, a portion for assembly of the light emitting portions 34 is provided only at the lower panel (24) of the instrument panel (20) and the light emitting portions (34) are assembled to the lower panel (24).

(Supplemental Explanation of Exemplary Embodiment)

Note that, in the above exemplary embodiment, the linear light emitting portions 34 are provided at the boundary between the upper panel 22 and the lower panel 24 of the instrument panel 20. However, the light emitting portions that are linear may be provided, for example, at the lower panel (24) of the instrument panel (20) at a region that is further toward the lower side than the boundary portion. As another modified example, the light emitting portions may be provided at a region that is at the front side of the vehicle cabin and is other than the instrument panel 20, for example, in the vicinity of the switch operating portions (refer to reference letters c in FIG. 2) at left and right spoke portions of the steering wheel 18, or at the lower portion of the rim portion of the steering wheel 18, or the like.

Further, as a modified example of the above exemplary embodiment, the central light emitting portion (34S) and the right-side light emitting portion (34R) may be integrated and made to be continuous. Note that the number of light sources at the respective light emitting portions is not limited to the example of the above exemplary embodiment. Moreover, the linear light emitting portions may be set at a height position that is further toward the lower side than the visual field when the driver drives while looking straight ahead, and the light emitting portions may extend in the vehicle vertical direction.

In the above-described exemplary embodiment, the position at which the light emitting portions 34 is disposed is set such that the direction Sd, in which the light emitting portions 34 are viewed from the position Ep that is assumed to be the eye point of the driver D, falls within a range of angles of depression of 20° to 40° as seen in a vehicle side view, with respect to the vehicle horizontal direction (refer to the two-dot chain line Vh) that passes-through the position Ep that is assumed to be the eye point. However, for example, the disposed position may be set at a height position that is slightly lower than a case in which setting is carried out in this way.

Moreover, in the above exemplary embodiment, the light emitting portions 34 are provided at a portion that includes an intermediate region in the vehicle transverse direction (the center cluster portion 20S (see FIG. 2)) at the front side of the vehicle cabin, and are structured to emit light at a blinking period of 200 ms to 600 ms. However, the structure of the light emitting portions is not limited to such a structure.

Further, the eaves portion 38 is provided in the above exemplary embodiment. However, a structure in which such an eaves portion 38 is not provided may be adopted.

Moreover, in the above exemplary embodiment, as illustrated in the schematic, partial, enlarged view of FIG. 4, the light diffusing portion 34D is provided at the lens cover 34C that is provided at the surface of the light emitting portion 34. However, the present invention is not limited to including such a structure.

As a modified example of the above exemplary embodiment, for example, there may be a structure in which an inattention detecting device, which detects that the driver is looking away, is provided, and the light emitting portions (34) are made to emit light in a case in which the inattention detecting device detects that the driver is looking away. Moreover, as another modified example, there may be a structure in which the light emitting portions (34) are made to emit light for a predetermined purpose other than alerting. Note that the plural light emitting portions (34) can also be understood as being an illumination device.

Note that any of various types of processors other than a CPU may execute the respective processings that are executed due to the CPU 40A, which is illustrated in FIG. 5, reading-out software (a program) in the above-described exemplary embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

The respective programs described in the above exemplary embodiment may be provided in a form of being recorded on a recording medium such as a CD-ROM (Compact Disc Read Only Memory), a DVD-ROM (Digital Versatile Disc Read Only Memory), a USB (Universal Serial Bus) memory, or the like. Further, the programs may be provided in a form that is downloaded from an external device over a network.

Note that the above-described exemplary embodiment and the above-described, plural modified examples can be implemented by being combined appropriately.

Although examples of the present disclosure have been described above, the present disclosure is not limited to the above, and can, of course, be implemented by being modified in various ways within a range that does not depart from the scope of the present disclosure.

What is claimed is:

1. A vehicle display device comprising:
    a light emitting device having a light emitting portion that is linear and that is provided at a front side of a vehicle cabin such that direct light that is emitted can be seen by a driver;
    a memory;
    a processor coupled to the memory; and
    an information acquisition device that acquires information regarding a periphery of a vehicle,
    wherein the light emitting portion is disposed at a height position that is configured to be further toward a lower side than a visual field of the driver in a case in which the driver drives while looking straight ahead,
    wherein, in a case in which the processor determines, based on information acquired by the information acquisition device, that a degree of necessity of alerting the driver is within a predetermined range that is lower than a preset reference, the processor controls the light emitting device so as to cause the light emitting portion to emit light, and
    wherein, in a case in which the driver does not perform a preset action in response to the light emission, the processor causes an alert, which is different from the light emission, to be provided to the driver.

2. The vehicle display device of claim 1, wherein a position at which the light emitting portion is disposed is determined such that a direction, in which the light emitting portion is viewed from a position that is assumed to be an eye point of the driver, falls within a range of angles of depression of 20° to 40° as seen in a vehicle side view, with respect to a vehicle horizontal direction that passes-through the position that is assumed to be the eye point.

3. The vehicle display device of claim 1, wherein the light emitting portion is provided at a portion that includes an intermediate region in a vehicle transverse direction at the front side of the vehicle cabin, and emits light at a blinking period of 200 ms to 600 ms.

4. The vehicle display device of claim 2, wherein the light emitting portion is provided at a portion that includes an intermediate region in a vehicle transverse direction at the front side of the vehicle cabin, and emits light at a blinking period of 200 ms to 600 ms.

5. The vehicle display device of claim 1, wherein an eaves portion, which extends obliquely toward a vehicle upward and rearward side from a region that is adjacent to the light emitting portion at an upper side of the light emitting portion, is provided.

6. The vehicle display device of claim 2, wherein an eaves portion, which extends obliquely toward a vehicle upward and rearward side from a region that is adjacent to the light emitting portion at an upper side of the light emitting portion, is provided.

7. The vehicle display device of claim 3, wherein an eaves portion, which extends obliquely toward a vehicle upward and rearward side from a region that is adjacent to the light emitting portion at an upper side of the light emitting portion, is provided.

8. The vehicle display device of claim 1, wherein a lens cover is provided at a surface of the light emitting portion, the surface facing an inner side of the vehicle cabin, and a light diffusing portion, which diffuses light from the inner side of the vehicle cabin so as to make it difficult to see an interior of the light emitting portion that is in a non-emitting state, is formed at the lens cover.

9. The vehicle display device of claim 2, wherein a lens cover is provided at a surface of the light emitting portion, the surface facing an inner side of the vehicle cabin, and a light diffusing portion, which diffuses light from the inner side of the vehicle cabin so as to make it difficult to see an interior of the light emitting portion that is in a non-emitting state, is formed at the lens cover.

10. The vehicle display device of claim 3, wherein a lens cover is provided at a surface of the light emitting portion, the surface facing an inner side of the vehicle cabin, and a light diffusing portion, which diffuses light from the inner side of the vehicle cabin so as to make it difficult to see an interior of the light emitting portion that is in a non-emitting state, is formed at the lens cover.

11. The vehicle display device of claim 5, wherein a lens cover is provided at a surface of the light emitting portion, the surface facing an inner side of the vehicle cabin, and a light diffusing portion, which diffuses light from the inner side of the vehicle cabin so as to make it difficult to see an interior of the light emitting portion that is in a non-emitting state, is formed at the lens cover.

12. The vehicle display device of a claim 1, wherein the light emitting portion is provided at a boundary between an upper panel, which structures an upper portion of an instrument panel provided at a front portion of the vehicle cabin, and a lower panel, which structures a lower portion of the instrument panel and is joined to the upper panel.

13. The vehicle display device of claim 12, wherein the light emitting portion extends substantially in a vehicle transverse direction.

14. The vehicle display device of a claim 1, further comprising:
   a speaker,
   wherein the alert, that is different from the light emission, comprises sound output from the speaker.

* * * * *